(12) United States Patent
Inayoshi et al.

(10) Patent No.: US 8,504,235 B2
(45) Date of Patent: Aug. 6, 2013

(54) APPARATUS AND METHOD FOR DETERMINING SEAT OCCUPANCY

(75) Inventors: Muneto Inayoshi, Nagoya (JP); Akira Enomoto, Kariya (JP); Hiroyuki Fujii, Kariya (JP); Ryota Nakanishi, Aichi-ken (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 251 days.

(21) Appl. No.: 12/813,900

(22) Filed: Jun. 11, 2010

(65) Prior Publication Data
US 2011/0010038 A1 Jan. 13, 2011

(30) Foreign Application Priority Data
Jul. 7, 2009 (JP) ................................ 2009-160903

(51) Int. Cl.
*G06F 7/00* (2006.01)
(52) U.S. Cl.
USPC ........................................................ 701/29.1
(58) Field of Classification Search
USPC ........................................................... 701/29
See application file for complete search history.

(56) References Cited

U.S. PATENT DOCUMENTS

| 2002/0024257 A1* | 2/2002 | Fujimoto et al. ............. 307/10.1 |
| 2011/0005843 A1 | 1/2011 | Ito et al. |
| 2011/0010037 A1 | 1/2011 | Inayoshi et al. |
| 2011/0010039 A1 | 1/2011 | Inayoshi et al. |
| 2011/0010056 A1 | 1/2011 | Inayoshi et al. |
| 2011/0010109 A1 | 1/2011 | Ito et al. |

FOREIGN PATENT DOCUMENTS

| JP | 2009-046093 | * | 3/2009 |
| JP | 2009-046093 A | | 3/2009 |

* cited by examiner

*Primary Examiner* — Thomas Tarcza
*Assistant Examiner* — Maceeh Anwari
(74) *Attorney, Agent, or Firm* — Buchanan Ingersoll & Rooney PC (57) ABSTRACT

An apparatus for determining a seat occupancy includes a load detecting portion attached to a seat portion of a seat for a vehicle and detecting a seat occupancy load, a seatbelt buckling detecting portion detecting an engagement of a buckle of a seatbelt, and a seat occupancy determining portion determining the seat occupancy on the basis of detection signals from the seatbelt buckling detecting portion and the load detecting portion. The seat occupancy determining portion determines a mounted state of a child seat, in which the child seat is placed on the seat and is fixed thereto by means of the seatbelt, in a case where the seat occupancy load changes so as to be increased at a predetermined speed or faster and subsequently so as to be decreased at a predetermined speed or faster, within a time period proximate to a time point when the buckle is engaged.

20 Claims, 8 Drawing Sheets

FIG. 11

APPARATUS AND METHOD FOR DETERMINING SEAT OCCUPANCY

CROSS REFERENCE TO RELATED APPLICATIONS

This application is based on and claims priority under 35 U.S.C. §119 to Japanese Patent Application 2009-160903, filed on Jul. 7, 2009, the entire content of which is incorporated herein by reference.

TECHNICAL FIELD

This disclosure relates to an apparatus and method for determining a seat occupancy of a vehicle.

BACKGROUND DISCUSSION

A known apparatus and method for determining a seat occupancy is disclosed in JP2009-46093A, in which load sensors are arranged between a cushion portion of a vehicle front passenger seat and a vehicle floor, and a seat occupancy on the vehicle seat is determined on the basis of the sum of loads, detected by the load sensors. Side leg portions are provided at four corners of a lower portion of the seat cushion portion, respectively. The seat cushion portion is engaged with seat rails at the side leg portions so as to be movable relative to the seat rails. The load sensors are provided to the side leg portions, respectively. The load sensors detect loads, applied to the corresponding side leg portions. A seat occupancy determining portion compares the sum of the loads, detected by the load sensors, with a predetermined threshold value, thereby determining the seat occupancy by a passenger on the vehicle seat.

The seat occupancy, which is determined by the apparatus for determining seat occupancy, is used to control an operation of an air-bag. More specifically, in a case where it is determined that an adult is seated on the vehicle seat, the air-bag is controlled so as to be fully deployable. On the other hand, in a case where it is determined that a passenger is not seated on the vehicle seat or that a child is seated on a child seat being fixed to the vehicle seat, the air-bag is controlled so as not to be deployable.

However, simply determining the seat occupancy on the vehicle seat on the basis of the sum of loads, applied to the vehicle seat, may lead to a drawback. For example, a large load may be temporarily applied to the seat cushion portion when a seatbelt is fastened relative to the child seat so as to mount the child seat on the vehicle seat. More specifically, when the child seat is placed on the vehicle seat and a tongue of the seatbelt is engaged with the buckle of the seatbelt, a large load is temporary applied to the seat cushion portion by a user via the buckle. When the loads, applied to the seat cushion portion, is a threshold value or larger, it may be mistakenly determined that an adult is seated on the vehicle seat.

Such drawback may be more likely to occur when the number of the load sensors, provided at the seat cushion portion, is reduced in view of cost reduction for the vehicle seat. In other words, it may be difficult to achieve the accurate determination of the seat occupancy of the vehicle seat and reduction of cost of the vehicle seat at the same time.

A need thus exists for an apparatus and method for determining seat occupancy, which is not susceptible to the drawback mentioned above.

SUMMARY

According to an aspect of this disclosure, an apparatus for determining a seat occupancy includes a load detecting portion attached to a seat portion of a seat for a vehicle and detecting a seat occupancy load, applied to the seat portion, a seatbelt buckling detecting portion detecting an engagement of a buckle of a seatbelt, provided for the seat for the vehicle, and a seat occupancy determining portion determining the seat occupancy of the seat for the vehicle on the basis of detection signals from the seatbelt buckling detecting portion and the load detecting portion. The seat occupancy determining portion determines a mounted state of a child seat, in which the child seat is placed on the seat for the vehicle and is fixed thereto by means of the seatbelt, in a case where the seat occupancy load changes so as to be increased at a predetermined speed or faster and subsequently so as to be decreased at a predetermined speed or faster, within a time period proximate to a time point when the buckle is engaged.

According to another aspect of this disclosure, a method for determining a seat occupancy includes detecting a load, applied to a seat portion of a seat for a vehicle, detecting an engagement state or a disengaged state of a buckle of a seatbelt, provided at the seat for the vehicle, and determining a mounted state of a child seat, in which the child seat is placed on the seat for the vehicle and is fixed thereto by means of the seatbelt, in a case where the load changes so as to be increased at a predetermined speed or faster and subsequently so as to be decreased at a predetermined speed or faster within a time period proximate to a time point where the engagement state of the buckle is detected.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of the apparatus for determining seat occupancy will be described hereinafter with reference to FIGS. 1 to 11. In the description, a front direction, seen by a passenger seated on a seat 1 for a vehicle (which will be referred to as a vehicle seat 1), corresponds to a front of the vehicle seat 1. Likewise, a rear direction, seen by the passenger seated on the vehicle seat 1, corresponds to a rear of the vehicle seat 1. Further, a right direction, seen by the passenger seated on the vehicle seat 1, corresponds to a right of the vehicle seat 1. Furthermore, a left direction, seen by the passenger seated on the vehicle seat 1, corresponds to a left of the vehicle seat 1.

Figure 1:
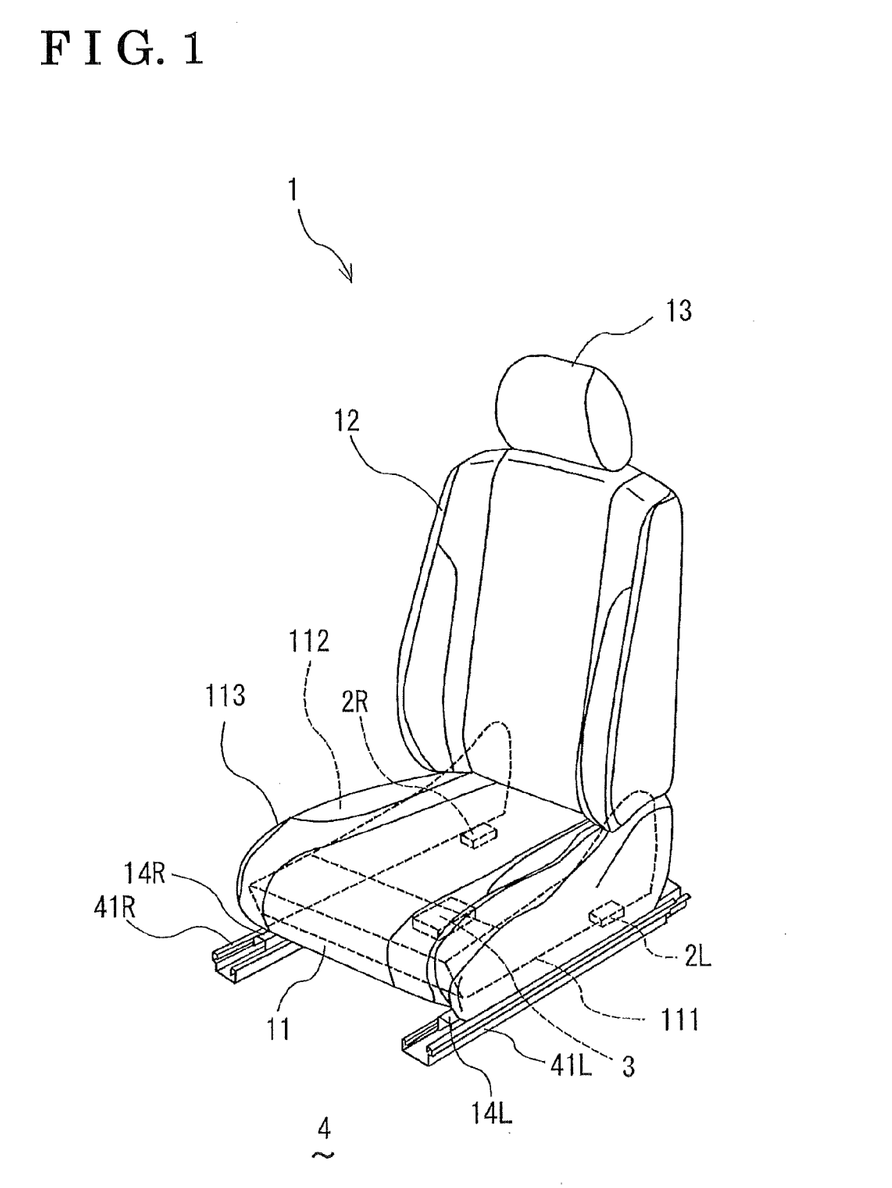
FIG. 1 is a perspective view illustrating a seat for a vehicle, on which an apparatus for determining a seat occupancy according to an embodiment, is mounted.

The vehicle seat 1 for a front passenger is mounted on a right-hand drive vehicle. As illustrated in FIG. 1, the vehicle seat 1 includes a seat cushion (a seat portion) 11, on which the passenger is seated, and a seat back 12, attached to a rear end portion of the seat cushion 11 so as to be rotatable in a front-rear direction of the vehicle and supporting the back of the passenger. A headrest 13 for supporting a head of the passenger is attached to a top end of the seat back 12.

The seat cushion 11 includes a seat frame 111, a pad member 112, arranged at an upper portion of the seat frame 111, and a cover 113, covering surfaces of the pad member 112. A pair of upper rails (a right upper rail and a left upper rail) 14R and 14L are arranged at lower surfaces of the seat frame 111. The upper rails 14R and 14L are engaged with a pair of lower rails (a right lower rail and a left lower rail) 41R and 41L, respectively, so as to be relatively movable in the front-rear direction. According to such structure, the vehicle seat 1 is movable relative to a floor 4 in the front-rear direction and is fixable at a selected position.

A pair of seat occupancy sensors (a right seat occupancy sensor 2R and a left seat occupancy sensor 2L) (a load detecting portion) 2R and 2L are arranged between the seat frame 111 and the corresponding one of upper rails 14R and 14L. Each of the pair of seat occupancy sensors 2R and 2L is configured by a load sensor, such as a strain gauge and the like. The pair of seat occupancy sensors 2R and 2L detect a load, applied to the seat cushion 11 in a downward direction, for example, when the passenger is seated on the vehicle seat 1, or when luggage is placed on the vehicle seat 1. According to the embodiment, a seat occupancy load indicates any one of a load applied when the passenger is seated, a load applied when a child seat is mounted, and a load when the luggage is placed. In other words, the seat occupancy load is any load, applied to the seat cushion 11 and detected by the pair of seat occupancy sensors 2R and 2L. The embodiment does not limit types, configurations and detection principles of the pair of the seat occupancy sensors 2R and 2L.

The right seat occupancy sensor 2R for detecting a load, received by the seat cushion 11 at a right portion thereof, is arranged between a right portion of the seat frame 111 and the right upper rail 14R. Likewise, the left seat occupancy sensor 2L for detecting a load, received by the seat cushion 11 at a left portion thereof, is arranged between a left portion of the seat frame 111 and the left upper rail 14L. The right seat occupancy sensor 2R and the left seat occupancy sensor 2L are spaced away from each other by a predetermined distance in a width direction of the seat cushion 11.

As illustrated in FIG. 1, the pair of seat occupancy sensors 2R and 2L are arranged at rear portions of the seat cushion 11 (more specifically, more rearward portions of the seat cushion 11 than an intermediate portion thereof in the front-rear direction), respectively. The right seat occupancy sensor 2R is arranged in the vicinity of a buckle 64 of a seatbelt device 6 (see FIG. 3, described further below). The right seat occupancy sensor 2R and the left seat occupancy sensor 2L will be inclusively referred to as the seat occupancy sensors 2R and 2L hereinafter.

Figure 2:
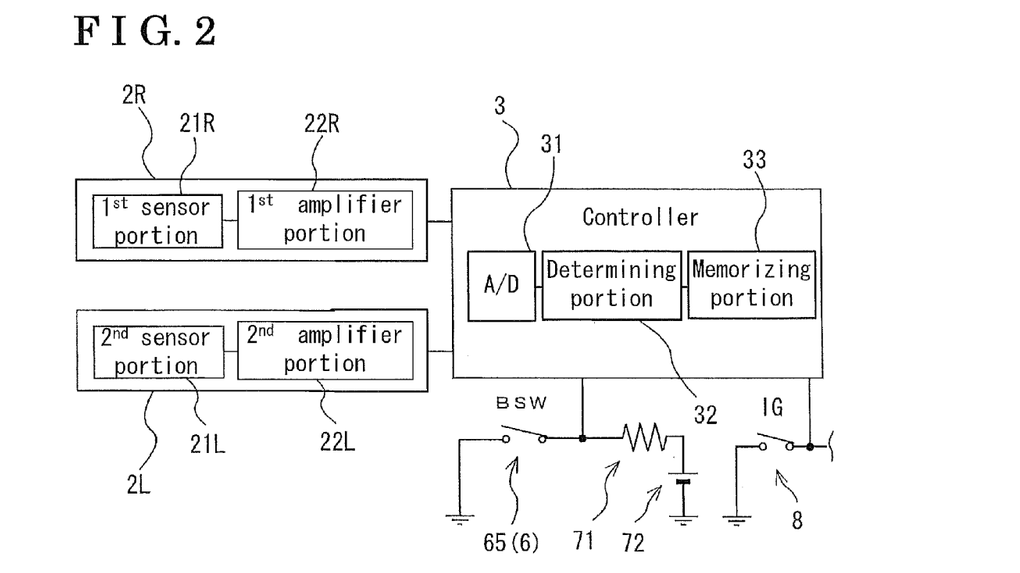
FIG. 2 is a block diagram illustrating an entire apparatus for determining the seat occupancy.

As illustrated in FIG. 2, the right seat occupancy sensor 2R includes a first sensor portion (a right sensor portion) 21R and a first amplifier portion (a right amplifier portion) 22R for amplifying detection signals, generated by the right sensor portion 21R. Likewise, the left seat occupancy sensor 2L includes a second sensor portion (a left sensor portion) 21L and a second amplifier portion (a left amplifier portion) 22L for amplifying detection signals, generated by the left sensor portion 21L. Each of the seat occupancy sensors 2R and 2L is configured by a Wheatstone bridge circuit, having four strain gauges.

The seat occupancy sensors 2R and 2L are connected to a controller (a seat occupancy determining portion) 3. The controller 3 includes an A/D converter 31, which converts detection signals, outputted from the seat occupancy sensors 2R and 2L, to digital signals, a determining portion 32, which determines a seat occupancy on the basis of the detection signals, and a memorizing portion 33, which memorizes data required to determine the seat occupancy.

The controller 3 is connected to a buckle switch (a seatbelt buckling detecting portion) (BSW) 65 of the seatbelt device 6 (described further below). The buckle switch 65 is connected to a battery 72 of the vehicle via a direct-current resistor 71. When the buckle switch 65 is in an opened state, an electric current does not flow through the direct-current resistor 71. Therefore, the controller 3 detects a positive-side terminal voltage (high) of the battery 72. When the buckle switch 65 is in a closed state, an electric current flows through the direct-current resistor 71. Therefore, the controller 3 detects a decrease in voltage (low) of the battery 72. Accordingly, the controller 3 detects that the buckle 64 is engaged with a tongue 63 (described further below) and that the seatbelt device 6 is fastened. Further, the controller 3 is connected to an ignition switch 8 of the vehicle. The controller 3 determines whether the ignition switch 8 is ON or OFF.

Figure 3:
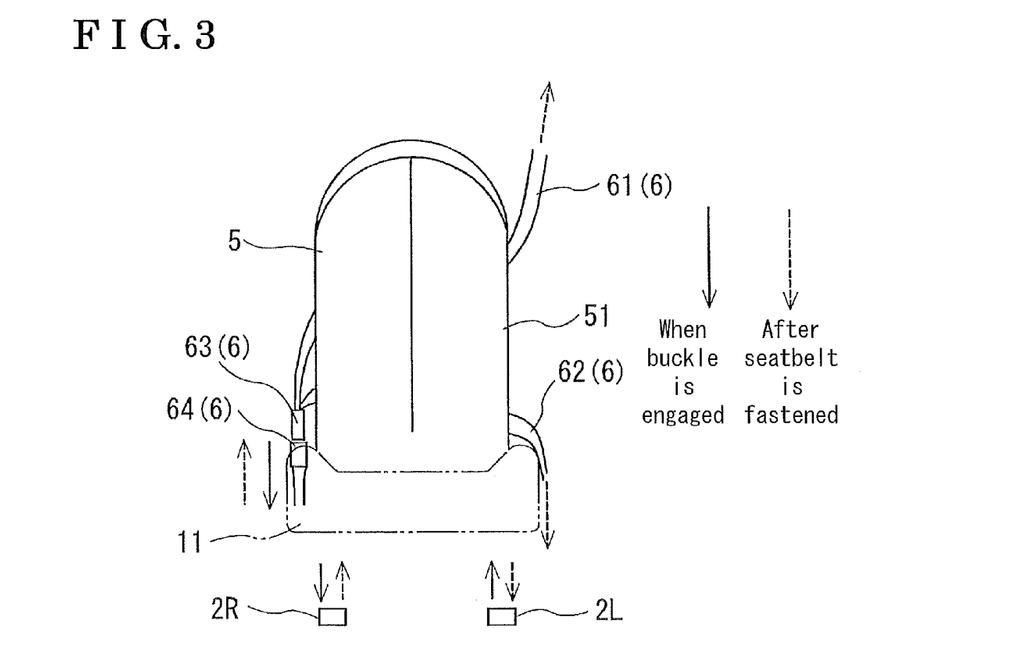
FIG. 3 is a simplified diagram illustrating loads, applied to the seat for the vehicle.

A procedure for mounting a child seat (an infant seat) 5 on the seat cushion 11 of the vehicle seat 1, and a generation of a load, applied on the vehicle seat 1 when the child seat 5 is mounted, will be described hereinafter with reference to FIG. 3. FIG. 3 is a front view of the vehicle seat 1 seen in a direction from a front to a rear direction of the vehicle. The seatbelt device (a seatbelt) 6 for the vehicle seat 1 includes a shoulder strap 61, a lap strap 62 and the buckle 64. One end of the shoulder strap 61 and one end of the lap strap 62 are connected to each other at the tongue 63. The buckle 64 is engaged with and disengaged from the tongue 63, thereby configuring the buckle switch 65. An upper retractor is arranged at a pillar, provided at a left of the vehicle seat 1. An upper end (the other end) of the shoulder strap 61 is connected to the upper retractor. The shoulder strap 61 can be pulled out against a rewinding force of the upper retractor.

The other end of the lap strap 62 is connected to a lower retractor, provided at a lower-left of the vehicle seat 1. A rewinding force of the lower retractor is applied to the lap strap 62. The buckle 64 is fixed to the vehicle seat 1 at a lower-right portion thereof so as to extend upwardly. The tongue 63, which is connected to the shoulder strap 61 and the lap strap 62, is engageable with the buckle 64 so as to be fixable thereto.

When the tongue 63 and the buckle 64 of the seatbelt device 6 are in a disengaged state, the buckle switch 65 is in an opened state (OFF). On the other hand, when the tongue 63 and the buckle 64 of the seatbelt device 6 are in an engaged state, the buckle switch 65 is in a closed state (ON), and the controller 3 detects that the seatbelt device 6 is buckled.

According to the embodiment, the child seat 5 is mounted on the vehicle seat 1 in a manner where an infant, seated on the child seat 5, faces rearward of the vehicle. After the child seat 5 is placed on the seat cushion 11, the shoulder strap 61 and the lap strap 62 of the seatbelt device 6 are pulled out and are set so as to pass through an inside of a seat back of the child seat 5. Then, the tongue 63, which is connected to the shoulder strap 61 and the lap strap 62, is engaged with the buckle 64. Consequently, the child seat 6 is fixed to the vehicle seat 1. Hereinafter, the mounting of the child seat 5 on the vehicle seat 1 refers to an operation where the child seat 5 is placed on the vehicle seat 1 and where the tongue 63 is engaged with the buckle 64, thereby fixing the child seat 5 to the vehicle seat 1 by means of the seatbelt device 6.

After placing the child seat 5 on the vehicle seat 1, the tongue 63 is thrust downwardly so as to be engaged with the buckle 64. Therefore, a load is locally and downwardly applied to a right portion of the vehicle seat 1. Accordingly, a detected load WR, detected by the right seat occupancy sensor 2R, is increased rapidly (see arrows shown by a solid line in FIG. 3). Due to the load, applied to the right portion of the vehicle seat 1, a momentum is applied to the seat cushion 11 in a counter-clockwise direction in FIG. 3. Therefore, a load, applied to a left portion of the vehicle seat 1, is decreased. Accordingly, a detected load WL, detected by the left seat occupancy sensor 2L, does not increase as much as the detected load WR, detected by the right seat occupancy sensor 2R.

After the seatbelt device 6 is set to the child seat 5, an end portion of the shoulder strap 61 is retracted upwardly by the upper retractor (a load for pulling the seat cushion 11 upwardly by means of the shoulder strap 61 will be referred to as a removal load hereinafter) while an end portion of the lap strap 62 is retracted downwardly by the lower retractor. Consequently, the detected load WR, detected by the right detection sensor 2R, is decreased while the detected load WL, detected by the left detection sensor 2L, is increased (see arrows shown by a dashed line in FIG. 3). Changing of the seat occupancy load, which is applied to the vehicle seat 1, serving as the front passenger seat of the right-hand drive vehicle, has been described so far. Further, a left-right location is inverted in a front passenger seat of a left-hand drive vehicle.

Figure 8:
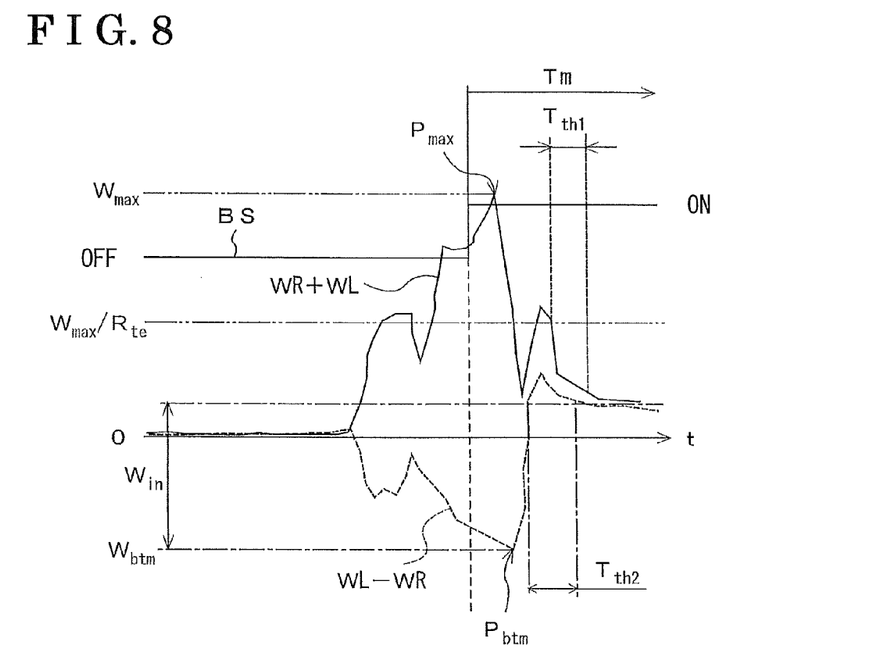
FIG. 8 is a diagram illustrating a state of a seat occupancy load, applied on the seat for the vehicle, illustrated in order to explain the determining method of the seat occupancy load decreasing ratio determination.

Changing of the detected load, detected by the right and left seat occupancy sensors 2R and 2L when the child seat 5 is mounted on the vehicle seat 1 will be described hereinafter with reference to FIG. 8. In FIG. 8, an operational signal of the buckle switch 65 is referred to as an operation signal BS. Further, a result of addition of the detected loads, detected by the right and left seat occupancy sensors 2R and 2L, will be referred to as an added load WR+WL. Furthermore, a result of subtracting the detected load, detected by the right seat occupancy sensor 2R, from the detected load, detected by the left seat occupancy sensor 2L, will be referred to as left-right difference load WL−WR hereinafter.

The child seat 5 is placed on the vehicle seat 1. Then, while the tongue 63 is being engaged with the buckle 64, the added load WR+WL is increased rapidly before and after the buckle switch 65 is switched to ON. Subsequently, after the engagement of the tongue 63 with the buckle 64 is completed, an application of the load in a downward direction relative to the vehicle seat 1 via the tongue 63 is released. Therefore, the right and left seat occupancy sensors 2L and 2R detect only loads of the child seat 5 and the infant, seated on the child seat 5. Accordingly, the added load WR+WL is decreased rapidly (see FIG. 8).

Further, as described above, at the time when the tongue 63 is inserted into the buckle 64 so as to be engaged therewith by applying the load downwardly, the detected load WR, detected by the right seat occupancy sensor 2R, is increased greater than the detected load WL, detected by the left seat occupancy sensor 2L. Therefore, the left-right difference load WL−WR is decreased rapidly to be a negative value before and after the buckle switch 65 is switched to ON.

Subsequently, after the engagement of the tongue 63 with the buckle 64 is completed, the application of the load in the downward direction relative to the vehicle seat 1 by the user via the tongue 63 is released. Therefore, the right and left seat occupancy sensors 2L and 2R detect only the loads of the child seat 5 and the infant, seated on the child seat 5. Accordingly, the left-right difference load WL−WR is increased rapidly from the negative value. In other words, the left-right difference load changes so as to form a substantially V shape (see FIG. 8).

On the other hand, for example, in a case where an adult, seated on the vehicle seat 1, operates the seatbelt device 6 so that the tongue 63 is engaged with the buckle 64, the above-described increase and decrease of the added load WR+WL and the V-shaped change of the left-right difference load WL−WR do not occur before and after the buckle switch 65 is switched to ON.

Figure 4:
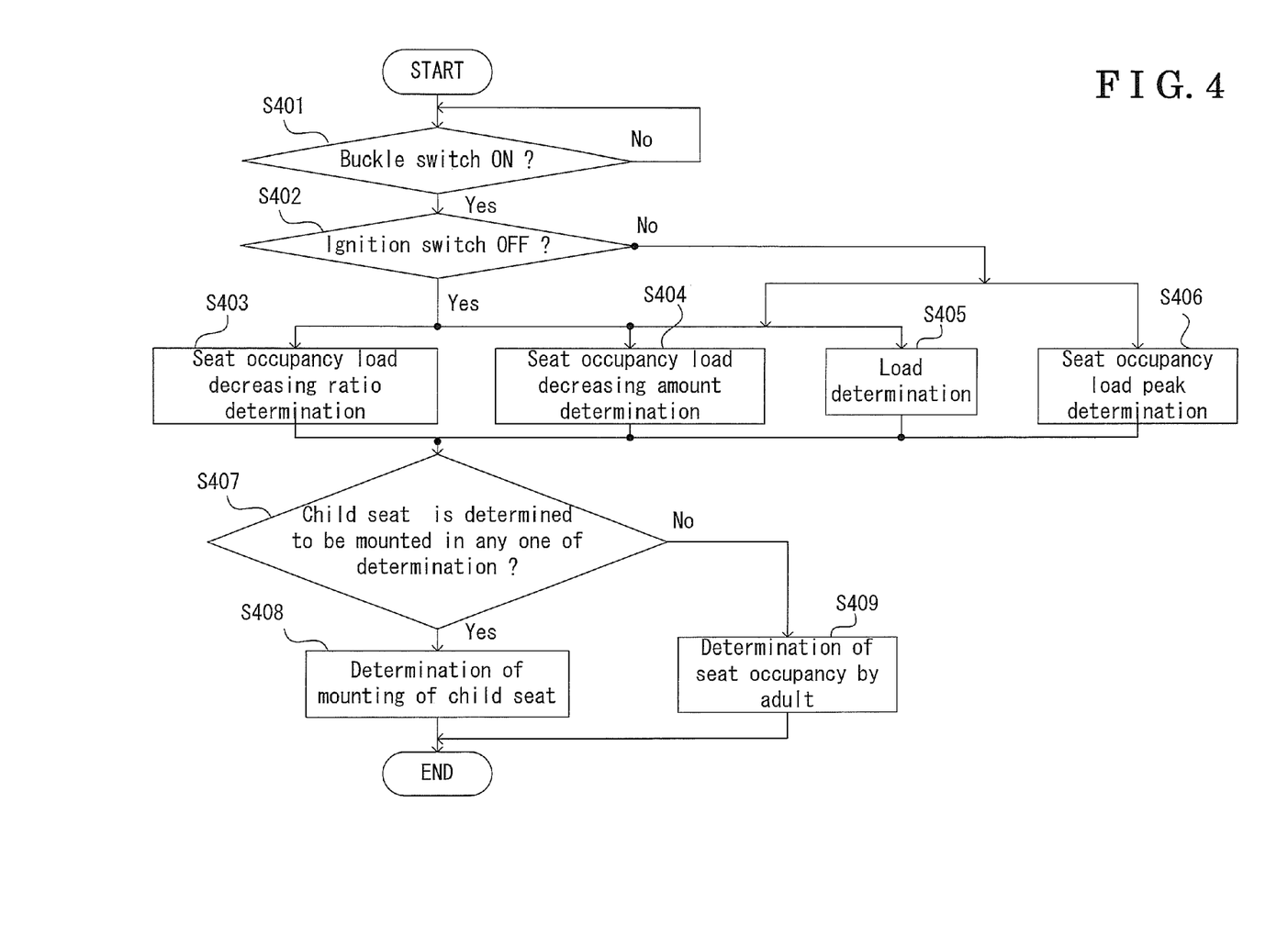
FIG. 4 is a main flowchart illustrating a determining method by means of the apparatus for determining seat occupancy shown in FIG. 2.
Figure 5:
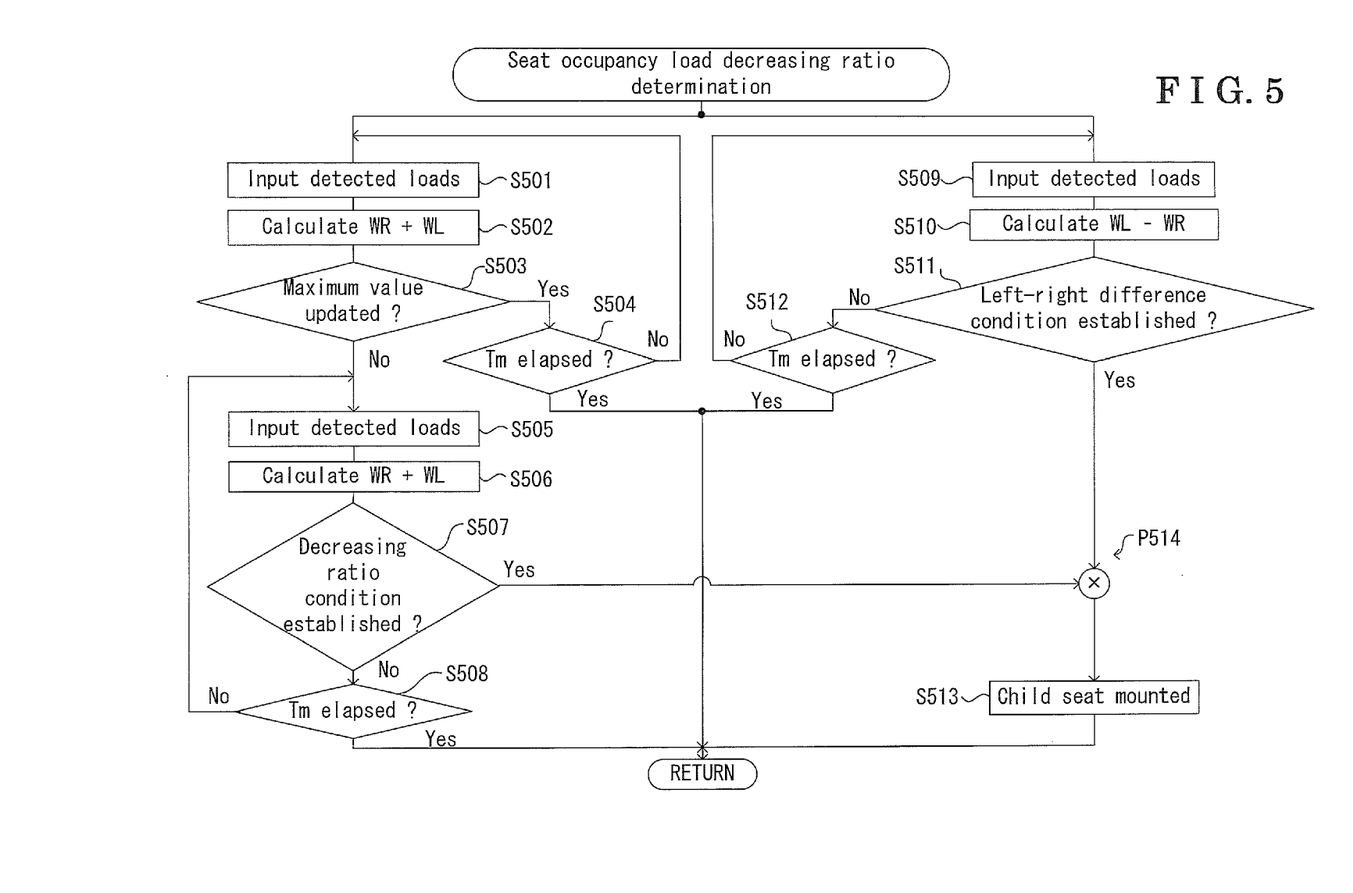
FIG. 5 is a sub flowchart illustrating a determining method of a seat occupancy load decreasing ratio determination shown in FIG. 4.

A method for determining seat occupancy on the vehicle seat 1 by means of the controller 3 according to the embodiment will be described hereinafter with reference to FIGS. 4 to 10. FIG. 4 is a main flowchart illustrating a determining method. Further, FIG. 5 is a sub flowchart illustrating a determining method of a seat occupancy load decreasing ratio determination shown in Step 403 of FIG. 4.

Figure 6:
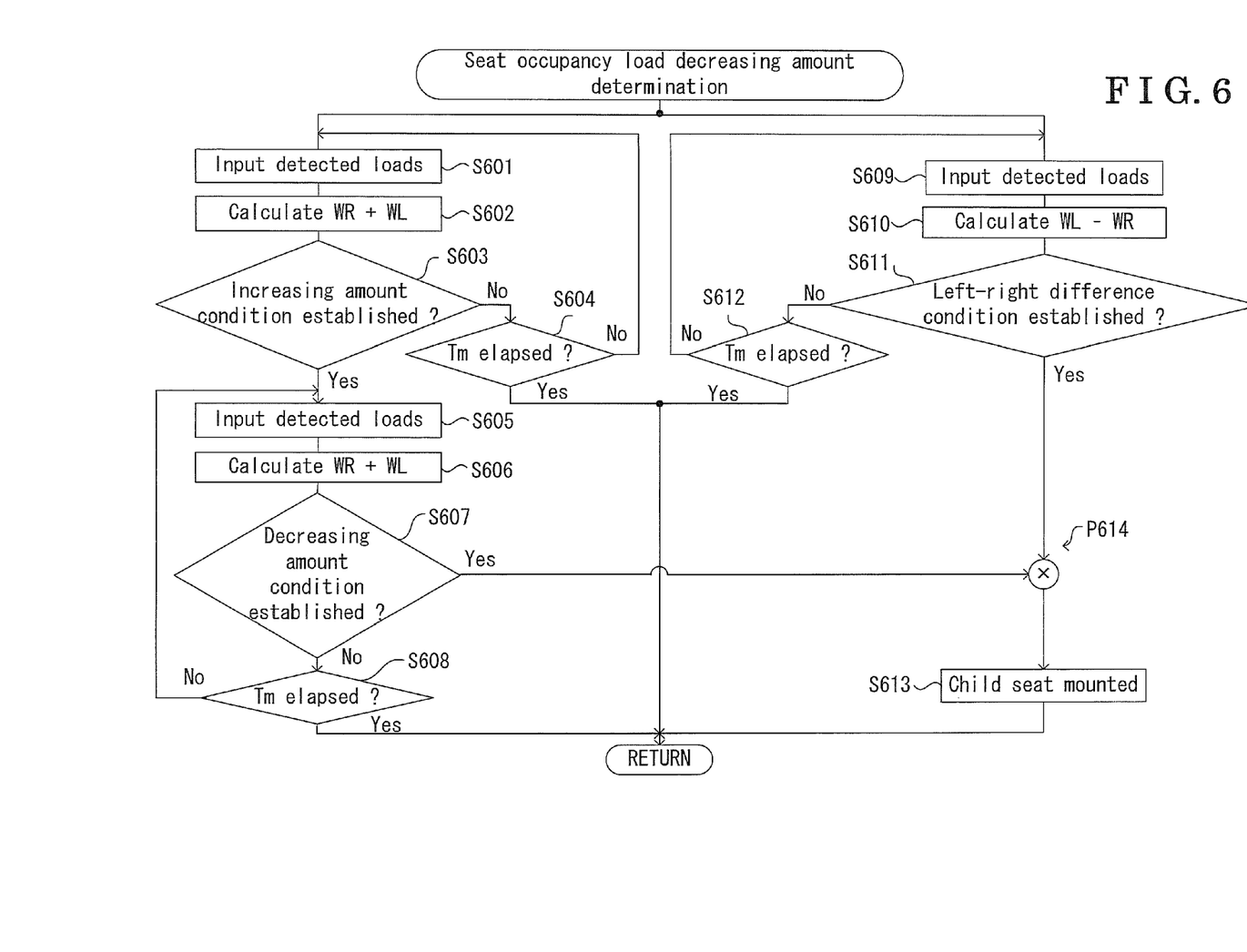
FIG. 6 is a sub flowchart illustrating a determining method of a seat occupancy load decreasing amount determination shown in FIG. 4.
Figure 7:
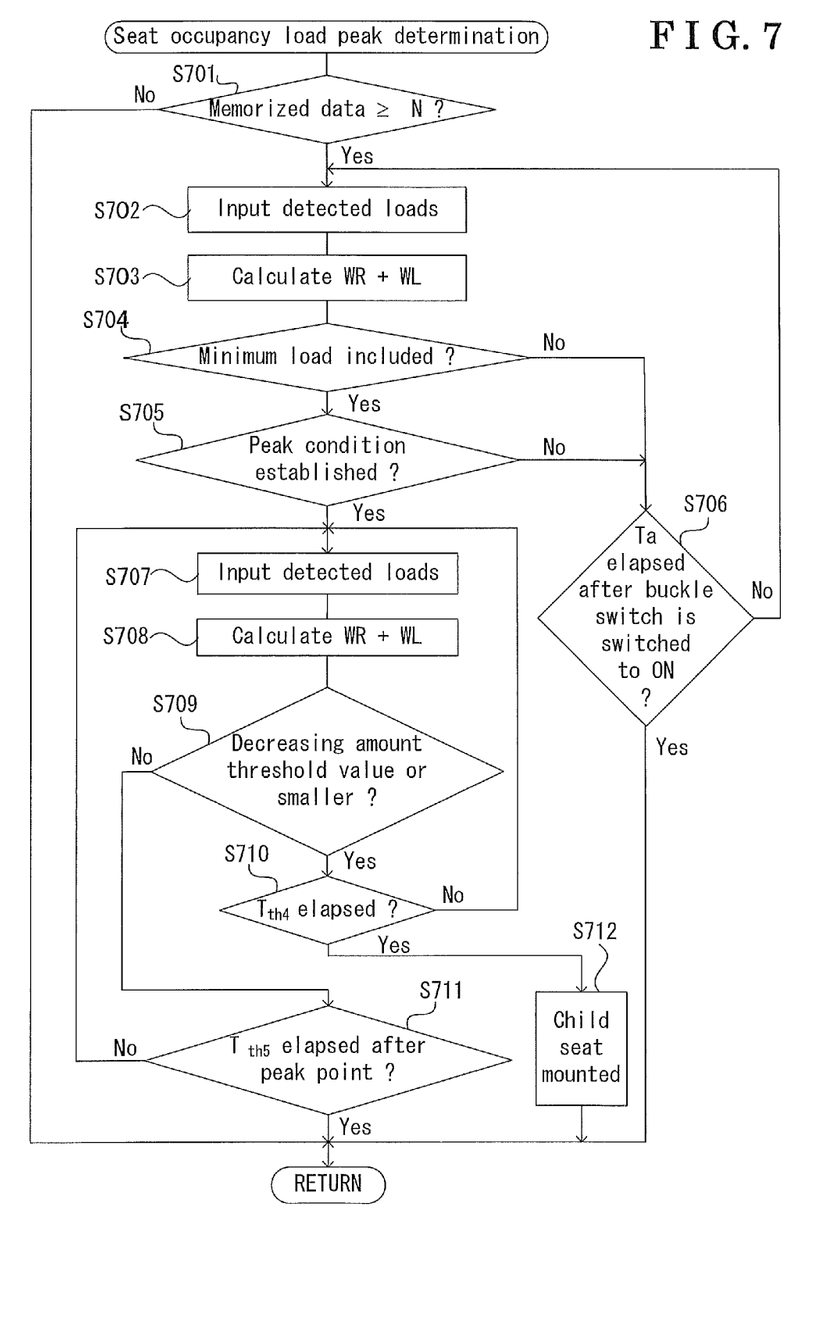
FIG. 7 is a sub flowchart illustrating a determining method of a seat occupancy load peak determination shown in FIG. 4.

Further, FIG. 6 is a sub flowchart illustrating a determining method of a seat occupancy load decreasing amount determination shown in Step 404 of FIG. 4. FIG. 7 is a sub flowchart illustrating a determining method of a seat occupancy load peak determination shown in Step 406 of FIG. 4. The seat occupancy load peak determination shown in FIG. 7 serves as a seat occupancy determining method according to the embodiment.

First, whether or not the buckle switch 65 of the seatbelt device 6 is switched to ON is determined (Step 401). According to the embodiment, regardless of an operational state of the ignition switch 8, a main controller of the vehicle monitors an operational state of the buckle switch 65. In a case where the main controller detects that the buckle switch 65 is switched to ON while the ignition switch 8 is being OFF, the main controller actuates the controller 3. Subsequently, the determination of seat occupancy on the vehicle seat 1 is executed by the controller 3.

When the main controller determines that the buckle switch 65 is switched to ON, the controller 3 determines whether or not the ignition switch 8 of the vehicle is being OFF (Step 402). Then, when the controller 3 determines that the ignition switch 8 is being OFF, a seat occupancy load decreasing ratio determination (Step 403), a seat occupancy load decreasing amount determination (Step 404) and a load determination (Step 405) are executed simultaneously.

On the other hand, when the controller 3 determines that the ignition switch 8 is being ON, the seat occupancy load decreasing ratio determination (Step 403), the seat occupancy load decreasing amount determination (Step 404), the load determination (Step 405) and a seat occupancy load peak determination (Step 406) are executed simultaneously. The seat occupancy load decreasing ratio determination, the seat occupancy load decreasing amount determination and the load determination and the seat occupancy load peak determination will be described further below.

When the seat occupancy load decreasing ratio determination (Step 403), the seat occupancy load decreasing amount determination (Step 404) and the load determination (Step 405) are ended, or when the seat occupancy load decreasing ratio determination (Step 403), the seat occupancy load decreasing amount determination (Step 404), the load determination (Step 405) and the seat occupancy load peak determination (Step 406) are ended, it is determined whether or not the child seat 5 is determined to be mounted on the vehicle seat 1 in any one of Steps 403 to 406 (Step 407).

When the child seat 5 is determined to be mounted on the vehicle seat 1 in any one of Steps 403 to 406, the controller 3 concludes that the child seat 5 is mounted on the vehicle seat 1, and sends a determination result to an ECU of an air-bag (Step 408).

When the child seat 5 is not determined to be mounted on the vehicle seat 1 in any one of Steps 403 to 406, the controller 3 concludes that the adult is seated on the vehicle seat 1, and sends a determination result to the ECU of the air-bag (Step 409). When the controller 3 determines that the adult is seated on the vehicle seat 1, the ECU of the air-bag controls the air-bag so as to be fully deployable. When the controller 3 does not determine that the adult is seated on the vehicle seat 1, the ECU of the air-bag controls the air-bag so as not to be fully deployable.

The above-described seat occupancy load decreasing ratio determination in Step 403 will be described hereinafter with reference to FIGS. 5 and 8. As described above, the seat occupancy load decreasing ratio determination is executed when the buckle switch 65 is switched to ON regardless of ON-OFF state of the ignition switch 8. In FIG. 5, Steps 501 to 508 and Steps 509 to 512 are executed simultaneously. Further, a connector P514 shown in FIG. 5 shows that Step 513 is executed when the process flows from both of Step 507 and Step 511.

First, the detected loads WR and WL, detected by the right and left seat occupancy sensors 2R and 2L, respectively, are inputted to the controller 3 (Step 501 and Step 509). Then, the controller 3 calculates the added load WR+WL and the left-right difference load WL−WR on the basis of the detected load, detected after the buckle switch 65 is switched to ON (Step 502 and Step 510).

After the added load WR+WL is calculated, a maximum value of the added value WR+WL is updated (Step 503). The maximum value of the added value WR+WL is updated when the added value WR+WL, calculated currently, is larger than the added value WR+WL, calculated previously. The maximum value of the added value WR+WL is not updated when the added value WR+WL is calculated for the first time.

After the maximum value of the added value WR+WL is updated, it is determined whether or not a predetermined time Tm has elapsed after the buckle switch 65 is switched to ON (Step 504). When the predetermined time Tm is determined to have elapsed, the seat occupancy load decreasing ratio determination is ended. When the predetermined time Tm is not determined to have elapsed, another detected load WR and another detected load WL are further inputted (Step 501), the added values WR+WL are calculated (Step 502), and then the maximum value of the added values WR+WL are updated once more in Step 503. As described above, the maximum value of the added value WR+WL is updated repeatedly in Step 503, thereby forming a peak point $P_{max}$ where the added value WR+WL reaches a maximum load $W_{max}$ (see FIG. 8).

When the added value WR+WL, calculated currently, is equal to or smaller than the added value WR+WL, calculated previously, the maximum value of the added value WR+WL is not updated. Subsequently, another detected load WR and another detected load WL are further inputted (Step 505), the added value WR+WL is calculated (Step 506), and then it is determined whether or not a seat occupancy load decreasing ratio condition is established in Step 507.

In the determination of the seat occupancy load decreasing ratio condition, it is determined whether or not the added value WR+WL continues to be smaller than a value, calculated by dividing a maximum load $W_{max}$ by a predetermined coefficient $R_{te}$ ($W_{max}/R_{te}$), for a first threshold time frame $T_{th1}$ (see FIG. 8). When the seat occupancy load decreasing ratio condition is determined to be established, the process progresses to the connector P514 (Step 507).

When the seat occupancy load decreasing ratio condition is determined not to be established, it is determined whether or not the predetermined time Tm has elapsed after the buckle switch 65 is switched to ON (Step 508). When the predetermined time Tm is determined not to have elapsed, another detected load WR and another detected load WL are further inputted (Step 505), the added value WR+WL is calculated (Step 506), and then it is determined once more whether or not the seat occupancy load decreasing ratio condition is established in Step 507. When the predetermined time Tm is determined to have elapsed, the seat occupancy load decreasing ratio determination is ended.

On the other hand, after the left-right difference load WL−WR is calculated in Step 510 on the basis of the detected loads WR and WL, it is determined whether or not a seat occupancy load left-right difference condition is established (Step 511). In the seat occupancy load left-right difference condition, it is determined whether or not the left-right difference load WL−WR continues to be larger than a lowest load $W_{btm}$, reached after the buckle switch 65 is switched to ON, by a first predetermined load amount $W_{in}$ or more for a second threshold time frame $T_{th2}$ (see FIG. 8). When the left-right difference condition is determined to be established, the process progresses to the connector P514 (Step 511). A point where the left-right difference load WL−WR reaches the lowest load $W_{btm}$ is shown as a bottom peak point $P_{btm}$ in FIG. 8.

When the left-right difference condition is determined not to be established, it is determined whether or not the predetermined time Tm has elapsed after the buckle switch 65 is switched to ON (Step 512). When the predetermined time Tm is determined not to have elapsed, another detected load WR and another detected load WL are further inputted (Step 509), the left-right difference WL−WR is calculated (Step 510), and then it is determined once more whether or not the left-right difference condition is established in Step 511. When the predetermined time Tm is determined to have elapsed, the seat occupancy load decreasing ratio determination is ended. When the seat occupancy load decreasing ratio condition is determined to be established in Step 507 and when the left-right difference condition is determined to be established in Step 511, it is determined that the child seat 5 is mounted on the vehicle seat 1 (Step 513).

Figure 9:
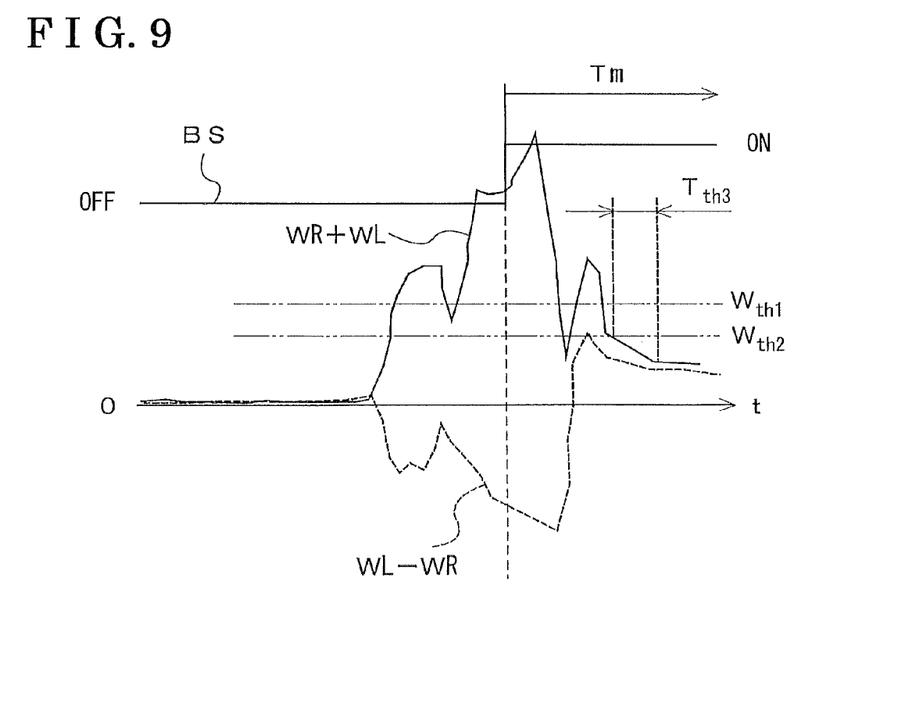
FIG. 9 is a diagram illustrating a state of the seat occupancy load, applied on the seat for the vehicle, illustrated in order to explain the determining method of the seat occupancy load decreasing amount determination.

The above-described seat occupancy load decreasing amount determination in Step 404 will be described hereinafter with reference to FIGS. 6 and 9. As described above, the seat occupancy load decreasing amount determination is executed when the buckle switch 65 is switched to ON regardless of ON-OFF state of the ignition switch 8. In FIG. 6, Steps 601 to 608 and Steps 609 to 612 are executed simultaneously. Further, a connector P614 shown in FIG. 6 describes that Step 613 is executed when the process flows from both of Step 607 and Step 611.

Similar to the seat occupancy load decreasing ratio determination, first, the detected loads WR and WL, detected by the right and left seat occupancy sensors 2R and 2L, respectively, are inputted to the controller 3 (Step 601 and Step 609). Then, the controller 3 calculates the added load WR+WL and the left-right difference load WL−WR on the basis of the detected load, detected after the buckle switch 65 is switched to ON (Step 602 and Step 610).

After the added load WR+WL is calculated, it is determined whether or not a seat occupancy load increasing amount condition is established (Step 603). In the increasing amount condition, it is determined whether or not the added value WR+WL is a first threshold load $W_{th1}$ or larger (see FIG. 9). When the increasing amount condition is determined to be established, another detected load WR and another detected load WL are further inputted (Step 605), the added value WR+WL is calculated (Step 606), and then it is determined whether or not a seat occupancy load decreasing amount condition is established in Step 607.

When the seat occupancy load increasing amount condition is determined not to be established, it is determined whether or not the predetermined time Tm has elapsed after the buckle switch 65 is switched to ON (Step 604). When the predetermined time Tm is determined not to have elapsed, another detected load WR and another detected load WL are further inputted (Step 601), the added value WR+WL is calculated (Step 602), and then it is determined once more whether or not a seat occupancy load increasing amount condition is established in Step 603. When the predetermined time Tm is determined to have elapsed, the seat occupancy load decreasing amount determination is ended. In the seat occupancy load decreasing amount condition in Step 607, it is determined whether or not the added value WR+WL continues to be a second threshold load $W_{th2}$ or smaller for a third threshold time frame $T_{th3}$ (see FIG. 9). When the decreasing amount condition is determined to be established, the process progresses to the connector 614 (Step 607).

When the seat occupancy load decreasing amount condition is determined not to be established, it is determined whether or not the predetermined time Tm has elapsed after the buckle switch 65 is switched to ON (Step 608). When the predetermined time Tm is determined not to have elapsed, another detected load WR and another detected load WL are further inputted (Step 605), the added value WR+WL is calculated (Step 606), and then it is determined once more whether or not the seat occupancy load decreasing amount condition is established in Step 607. When the predetermined time Tm is determined to have elapsed, the seat occupancy load decreasing amount determination is ended.

Steps 609 to 612 of the seat occupancy load decreasing amount determination shown in FIG. 6 are the same as Steps 509 to 512 of the seat occupancy load decreasing ratio determination shown in FIG. 5. Therefore, the description of Steps 609 to 612 will be omitted. Similar to the seat occupancy load decreasing ratio determination, when the seat occupancy load decreasing amount condition is determined to be established in Step 607 and when the left-right difference condition is determined to be established in Step 611, it is determined that the child seat 5 is mounted on the vehicle seat 1 (Step 613). In the seat occupancy load decreasing ratio determination and the seat occupancy load decreasing amount determination, the predetermined time Tm is set to be longer than the first threshold time frame $T_{th1}$, the second threshold time frame $T_{th2}$, and the third threshold time frame $T_{th3}$.

The above-described load determination in Step 405 will be described hereinafter. As described above, the load determination is executed when the buckle switch 65 is switched to ON regardless of ON-OFF state of the ignition switch 8. In the load determination, when the added load WR+WL continues to be smaller than a predetermined load for a predetermined time frame after the buckle switch 65 is switched to ON, it is determined that the child seat 5 is mounted on the vehicle seat 1.

The above-described the seat occupancy load peak determination in Step 406 will be described hereinafter with reference to FIGS. 7 and 10. As described above, the seat occupancy load peak determination is executed only in a case where the ignition switch 8 is being ON when the buckle switch 65 is switched to ON.

First, it is determined whether or not equal to or more than a predetermined number N of data of the added load WR+WL is memorized in the memorizing portion 33 of the controller 3 (alternatively, equal to or more than a predetermined number N of sets of data of the detected load WR, detected by the right seat occupancy sensor 2R and the detected load WL, detected by the left seat occupancy sensor 2L, may be memorized in the memorizing portion 33 of the controller 3) (Step 701). The data of added load WR+WL is obtained at a predetermined time cycle. Therefore, the fact that equal to or more than the predetermined number N of data of the added load WR+WL is memorized indicates that all the data of added load WR+WL, which are obtained during a predetermined time period ta (i.e., during a proximate time period shown in FIG. 10 and before the buckle switch 65 is switched to ON) is memorized.

For example, in a case where the predetermined time period ta has not elapsed after the ignition switch 8 is switched to ON before the buckle switch 65 is switched to ON, it is determined that equal to or more than predetermined number N of data of added load WR+WL is not memorized. Accordingly, the seat occupancy load peak determination is ended. The above-described proximate time period is a predetermined continuous time period set to include a time point when the buckle switch 65 is switched to ON. The proximate time period corresponds to a proximate time to the time point when the tongue 63 is engaged with the buckle 64.

When it is determined that equal to or more than predetermined number N of data of added load WR+WL is memorized, another detected load WR and another detected load WL are further inputted (Step 702), and the added value WR+WL is calculated (Step 703). Subsequently, it is determined whether or not a minimum load $W_{min}$, which is a third threshold load $W_{th3}$ or larger, is included in the added load WR+WL, obtained before and after the buckle switch 65 is switched to ON (see FIG. 10 and Step 704). A point where the added load WR+WL reaches the minimum load $W_{min}$ is shown as a minimum peak point $P_{in}$ in FIG. 10. When the minimum load $W_{min}$ is determined not to be included in the added load WR+WL, it is determined whether or not the predetermined time period ta has elapsed after the buckle switch 65 is switched to ON (i.e., during the proximate time period shown in FIG. 10 and after the buckle switch 65 is switched to ON) (Step 706).

When the predetermined time period ta is determined not to have elapsed, another detected load WR and another detected load WL are further inputted (Step 702), and the added value WR+WL is calculated (Step 703). Subsequently, it is determined once more whether or not the minimum load $W_{min}$ is included in the added load WR+WL in Step 704.

When the predetermined time period ta is determined have elapsed, the seat occupancy load peak determination is ended.

When the minimum load $W_{min}$ is determined to be included in the added load WR+WL, the minimum load $W_{min}$ is memorized in the controller 3. Then, it is determined whether or not a seat occupancy load peak condition is established (Step 705). In the seat occupancy load peak condition, it is determined whether or not the maximum load $W_{max}$, which is larger than the minimum load $W_{min}$ by a second predetermined load amount $W_{as}$, is included in the memorized added load WR+WL, obtained before the buckle switch 65 is switched to ON, or in the memorized added load WR+WL, obtained after the buckle switch 65 is switched to ON (see FIG. 10).

Figure 10:
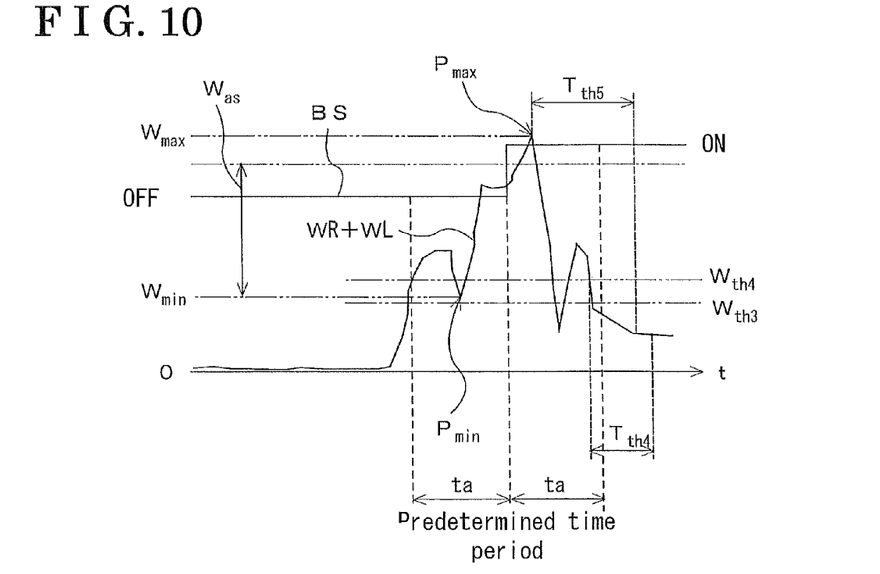
FIG. 10 is a diagram illustrating a state of the seat occupancy load, applied on the seat for the vehicle, illustrated in order to explain the determining method of the seat occupancy load peak determination.

Accordingly, even in a different case than FIG. 10 where the peak point $P_{max}$ where the added load WR+WL reaches the maximum load $W_{max}$, is formed before the buckle switch 65 is switched to ON, the seat occupancy load peak condition may be determined to be established. When the seat occupancy load peak condition is determined not to be established in Step 705, it is determined whether or not the predetermined time ta has elapsed (Step 706).

When the predetermined time ta has not elapsed, another detected load WR and another detected load WL are further inputted (Step 702), the added value WR+WL is calculated (Step 703), and then it is determined once more whether or not the seat occupancy load peak condition is established. In such a case, the minimum load $W_{min}$ is memorized in the controller 3. Therefore, Step 704 is skipped. When the predetermined time ta has elapsed, the seat occupancy load peak determination is ended. According to the embodiment, the predetermined time period ta of the proximate time period before the buckle switch 65 is switched to ON is set to be substantially the same as the predetermined time period ta of the proximate time period after the buckle switch 65 is switched to ON. However the predetermined time period ta of the proximate time period before the buckle switch 65 is switched to ON and the predetermined time period ta of the proximate time period after the buckle switch 65 is switched to ON may be set to be different periods of time from each other.

When the seat occupancy load peak condition is determined to be established in Step 705, another detected load WR and another detected load WL are further inputted (Step 707) and the added value WR+WL is calculated (Step 708). Then, it is determined whether or not the added load WR+WL is equal to or smaller than a fourth threshold load $W_{th4}$, serving as a decreasing amount threshold value (a predetermined decreasing load) (see FIG. 10 and Step 709). When the added load WR+WL is determined to be the fourth threshold load $W_{th4}$ or smaller, it is determined whether or not the added load WR+WL continues to be the fourth threshold load $W_{th4}$ or smaller for a fourth threshold time frame $T_{th4}$ (a first predetermined time frame) (see FIG. 10 and Step 710).

When the added load WR+WL is determined to be the fourth threshold load $W_{th4}$ or smaller for a fourth threshold time frame $T_{th4}$, it is determined that the child seat 5 is mounted on the vehicle seat 1 (Step 712). When the fourth threshold time frame $T_{th4}$ is determined not to have elapsed, another detected load WR and another detected load WL are further inputted (Step 707), and the added value WR+WL is calculated (Step 708). Then, it is determined once more whether or not the added value WR+WL is the fourth threshold load $W_{th4}$ or smaller.

When the added value WR+WL is determined not to be the fourth threshold load $W_{th4}$ or smaller in Step 709, it is determined whether or not a fifth threshold time frame $T_{th5}$ (a second predetermined time frame) has elapsed after the peak point $P_{max}$ where the added load WR+WL reaches the maximum load $W_{max}$ (see FIG. 10 and Step 711).

When the fifth threshold time frame $T_{th5}$ is determined to have elapsed, the seat occupancy load peak determination is ended. When the fifth threshold time frame $T_{th5}$ is determined not to have elapsed, another detected load WR and another detected load WL are further inputted (Step 707), and the added value WR+WL is calculated (Step 708). Then, it is determined once more whether or not the added value WR+WL is the fourth threshold load $W_{th4}$ or smaller in Step 709.

In the above-described seat occupancy load decreasing ratio determination, the seat occupancy load decreasing amount determination, and the seat occupancy load peak determination, conditions for determining that the child seat 5 is mounted on the vehicle seat 1 (which will be referred to as added condition hereinafter) are set in the controller 3 on the basis of characteristics of the added load WR+WL. According to the embodiment, the added condition of the seat occupancy load decreasing ratio determination is that the added value WR+WL continues to be smaller than the value, calculated by dividing the maximum load $W_{max}$ by the predetermined coefficient $R_{te}$ ($W_{max}/R_{te}$), for the first threshold time frame $T_{th1}$ after the buckle switch 65 is switched from OFF to ON within the predetermined time Tm.

According to the embodiment, the added condition of the seat occupancy load decreasing amount determination for determining that the child seat 5 is mounted on the vehicle seat 1 is set in the controller 3 on the basis of characteristics of the added load WR+WL. More specifically, the added condition of the seat occupancy load decreasing amount determination is that the added value WR+WL is increased to the first threshold load $W_{th1}$ or larger and subsequently continues to be the second threshold load $W_{th2}$ or smaller for the third threshold time frame $T_{th3}$ after the buckle switch 65 is switched from OFF to ON within the predetermined time Tm.

According to the embodiment, the added condition of the seat occupancy load peak determination for determining that the child seat 5 is mounted on the vehicle seat 1 is set in the controller 3 on the basis of characteristics of the added load WR+WL. More specifically, the added condition of the seat occupancy load peak determination is that the added load WR+WL reaches the maximum load $W_{max}$, which is larger than the minimum load $W_{min}$ being larger than the third threshold load $W_{th3}$, by the second predetermined load amount $W_{as}$ or larger, and continues to be the fourth threshold load $W_{th4}$ or smaller for the fourth threshold time frame $T_{th4}$ within the fifth threshold time frame $T_{th5}$ after the peak point $P_{max}$ where the added load WR+WL reaches the maximum load $W_{max}$, is formed, at the proximity to the time point when the buckle switch 65 is switched from OFF to ON (i.e., in the proximate time period including the predetermined time period ta set before the buckle switch 65 is switched from OFF to ON and the predetermined time period ta set after the buckle switch 65 is switched from OFF to ON). As long as the added load WR+WL reaches the fourth threshold load $W_{th4}$ or smaller during the fifth threshold time frame $T_{th5}$, even when the fourth threshold time frame $T_{th4}$ elapses after the fifth threshold time frame $T_{th5}$ has elapsed, the seat occupancy load peak determination is determined to be established. Accordingly, a predetermined speed, at which the seat occupancy load is increased, is set to be $W_{as}/2ta$ and a predetermined speed, at which the seat occupancy load is decreased, is set to be $(W_{max}-W_{th4}) T_{th5}$.

In the above-described seat occupancy load decreasing ratio determination and the seat occupancy load decreasing amount determination, the left-right difference conditions for determining that the child seat 5 is mounted on the vehicle seat 1 is set in the controller 3 on the basis of characteristics of the left-right difference WL−WR. According to the embodiment, the left-right difference condition is that the left-right difference load WL−WR continues to be the lowest load $W_{btm}$ or larger by the first predetermined load amount $W_{in}$ or more for a second threshold time frame $T_{th2}$ after the buckle switch 65 is switched from OFF to ON within the predetermined time Tm.

Figure 11:
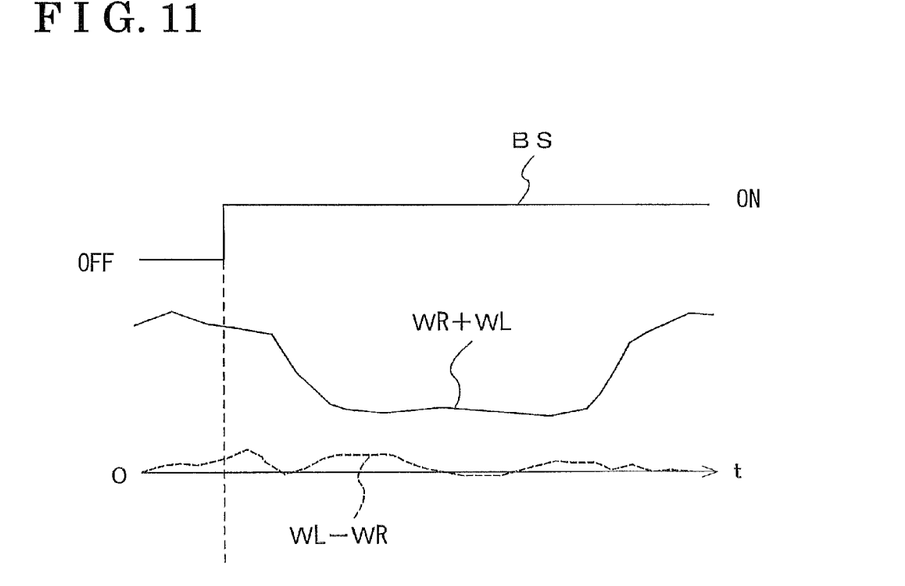
FIG. 11 is a comparative diagram illustrating a state of the seat occupancy load, applied on the seat for the vehicle when a passenger, seated on the seat for the vehicle, leans forward.

As illustrated in FIG. 11, when an adult passenger, for example, seated on the vehicle seat 1, leans forward, the added load WR+WL changes slightly. However, the characteristic of the added load WR+WL for forming the peak is not shown, and the above-described added conditions are not established. Further, the left-right difference load WL−WR may not rapidly change due to a movement of the passenger seated on the vehicle seat 1. Therefore, the above-described left-right difference condition is not established. Accordingly, mounting of the child seat 5 on the vehicle seat 1 is distinguished from the seat occupancy by the passenger on the vehicle seat 1 and is accurately determined in a manner of determining the added condition and the left-right difference condition.

According to the embodiment, in a case where the seat occupancy load (i.e., the added load WR+WL) is increased at the predetermined speed $W_{as}/2ta$ or faster and the seat occupancy load (i.e., the added load WR+WL) is decreased at the predetermined speed $(W_{max}-W_{th4})T_{th5}$ or faster at the proximity to the time point when the tongue 63 of the seatbelt device 6 is engaged with the buckle 64, it is determined that the child seat 5 is mounted on the vehicle seat 1 and then fixed thereto by the seatbelt device 6. Accordingly, when the value of the added load WR+WL changes abruptly so as to form a predetermined sharp angle at the peak point, it is determined that the vehicle seat 1 is in a state where the child seat 5 is mounted thereon.

According to the embodiment, the speed of the seat occupancy load includes not only the differential value of the seat occupancy load but also various forms of a changing amount with respect to a progress of time, such as the difference of the seat occupancy load within a predetermined period. Further, according to the embodiment, the changing of the seat occupancy load at the proximity to the time point when the buckle 64 is engaged, corresponds to the changing of the seat occupancy load, caused by the engagement operation of the buckle 64 of the seatbelt device 6, such as the changing of the seat occupancy load before and after the timing of the engagement operation of the buckle 64.

According to the embodiment, it is determined that the vehicle seat 1 is in a state where the child seat 5 is mounted thereon when the seat occupancy load changes so as to be decreased at the predetermined speed $(W_{max}-W_{th4})/T_{th5}$ or faster. Such determination includes that it is determined that the vehicle seat 1 is in a state where the child seat 5 is mounted thereon when the seat occupancy load changes so as to be decreased at the predetermined speed $(W_{max}-W_{th4})/T_{th5}$ or faster and then continues to be the predetermined fourth threshold load $W_{th4}$ or smaller for the predetermined fourth time frame $T_{th4}$.

When the child seat 5 is placed on the vehicle seat 1 and the seatbelt device 6 is buckled, the buckle 64 is thrust downwardly so that the tongue 63 of the seatbelt device 6 is engaged with the buckle 64. Therefore, the added load WR+WL of the vehicle seat 1 is increased rapidly. On the other hand, when the mounting of the child seat 5 on the vehicles seat 1 is completed, a thrusting force relative to the buckle 64 is released. Therefore, the added load WR+WL of the vehicle seat 1 is decreased rapidly. According to the embodiment, the mounting of the child seat 5 on the vehicle seat 1 may be accurately determined on the basis of the rapid increase of the added load WR+WL at the time of mounting the child seat 5 and the rapid decrease of the added load WR+WL at the time of mounting the child seat 5.

In the seat occupancy load peak determination, it is determined that the child seat 5 is mounted on the vehicle seat 1 when the added load WR+WL is increased by the predetermined load amount $W_{as}$ or more during the predetermined proximate time period, and when the added load WR+WL is decreased to the predetermined fourth threshold load $W_{th4}$ or smaller within the fifth threshold time frame $T_{th5}$ after the peak point $P_{max}$ where the added load WR+WL reaches the maximum load $W_{max}$ and then the added load WR+WL continues to be the predetermined fourth threshold load $W_{th4}$ or smaller for the determined fourth threshold time frame $T_{th4}$ or longer. Accordingly, the mounting of the child seat 5 on the vehicle seat 1 may be accurately determined on the basis of difference of the added load WR+WL within the predetermined time period.

Further, when the added load WR+WL continues to be the fourth threshold load $W_{th4}$ or smaller for the fourth threshold time frame $T_{th4}$ or longer, the mounting of the child seat 5 on the vehicle seat 1 may be accurately determined on the basis of the stabilization of the decreased added load WR+WL.

☐☐☐☐ In the seat occupancy load peak determination, the determination of the mounting of the child seat 5 on the vehicle seat 1 is executed only in a case where the ignition switch 8 of the vehicle is being ON when the buckle switch 65 is switched to ON. Therefore, even when the peak of the added load WR+WL is generated before the tongue 63 is engaged with the buckle 64, the peak is determined, using the data of the added load WR+WL, which is memorized after the ignition switch 8 is turned to ON before the tongue 63 is engaged with the buckle 64, thereby determining the mounting of the child seat 5 on the vehicle seat 1.

According to the embodiment, it is determined whether or not the seat occupancy load left-right difference condition is established in the seat occupancy load decreasing ratio determination and the seat occupancy load decreasing amount determination. When the child seat 5 is placed on the vehicle seat 1, and the seatbelt device 6 is buckled, the buckle 64 is thrust downwardly so that the tongue 63 is engaged with the buckle 64. Therefore, the seat occupancy load, applied to one side of the seat cushion 11 in the left-right direction thereof, is increased rapidly relative to the other side thereof. On the other hand when the mounting of the child seat 5 on the vehicle seat 1 is completed, the thrusting force relative to the buckle 64 is released. Therefore, imbalance of the seat occupancy load, applied to the seat cushion 11, between the left and right sides thereof is equalized.

According to the embodiment, the equalization of the imbalance of the seat occupancy load of the seat cushion 11 between the left and right sides thereof at the time of completion of the mounting of the child seat 5 is determined on the basis of the changing of the left-right difference load WL−WR. Accordingly, the mounting of the child seat 5 on the vehicle seat 1 may be accurately determined. When the mounting of the child seat 5 by means of the seatbelt device 6 is completed, the removal load for pulling the seat cushion 11 upwardly by means of the shoulder strap 61 is applied to the seat cushion 11. Therefore, the above-described the first predetermined load amount $W_{in}$ (see FIG. 8) may be set to be a large value, depending on the removal load, applied to the seat cushion 11. Accordingly, the mounting of the child seat 5 on the vehicle seat 1 may be accurately determined.

At least one right seat occupancy sensor 2R and at least one left seat occupancy sensor 2L are attached to the seat cushion at right and left portions thereof, respectively. Therefore, the increase of the added load WR+WL at the time when the tongue 63 is engaged with the buckle 64, provided at a side portion of the seat cushion 11, may be easily determined. Furthermore, the added load, which is calculated by adding the load, detected by the left seat occupancy sensor 2L, to the load, detected by the right seat occupancy sensor 2R, are used in the seat occupancy determination. Therefore, even when the seat occupancy load is not equal between the left and right sides of the vehicle seat 1, the mounting of the child seat 5 on the vehicle seat 1 may be accurately determined.

The right and left seat occupancy sensors 2R and 2L are attached to the rear portion of the seat cushion 11. Therefore, the load of the passenger or the load of the child seat 5 may be easily applied to the right and left seat occupancy sensors 2R and 2L. Accordingly, even when the right and left seat occupancy sensors 2R and 2L are not provided to a front portion of the seat cushion 11, the load, applied to the seat cushion 11, is accurately detected. As a result, the seat occupancy of the vehicle seat 1 may be accurately determined while a cost of the vehicle seat 1 is reduced in such a manner that the number of right and left seat occupancy sensors 2R and 2L is reduced.

According to the embodiment, when the condition is established in at least one of the seat occupancy load decreasing ratio determination, the seat occupancy load decreasing amount determination, the load determination and the seat occupancy load peak determination, the mounting of the child seat 5 on the vehicle seat 1 is determined. Therefore, it may be accurately determined that the vehicle seat 1 is in a state where the child seat 5 is mounted thereon. Further, the seat occupancy load decreasing ratio determination, the seat occupancy load decreasing amount determination, the load determination and the seat occupancy load peak determination are executed simultaneously. Therefore, timing of determination may not be delayed. Accordingly, it may be accurately determined that the vehicle seat 1 is in a state where the child seat 5 is mounted thereon.

[Other Embodiment]

The above-described embodiment may be modified as follows. According to the above-described embodiment, in the seat occupancy load peak determination, the added load WR+WL is determined to be increased at the predetermined speed $W_{as}/2ta$ or faster on the basis of the difference value of the added load during the predetermined time period. Alternatively or in addition, the added load WR+WL may be determined to be increased at the predetermined speed $W_{as}/2ta$ or faster on the basis of a detection of equal to or larger than a predetermined differential value of the added load WR+WL at the proximity to the time point when the seatbelt device 6 is buckled. Accordingly, the added load WR+WL is determined to be increased at the predetermined speed $W_{as}/2ta$ or faster rapidly, and a time required to determine the peak of the added load WR+WL may be shortened.

As an alternative to the difference value of the added load WR+WL and the differential value of the added load WR+WL, or in addition to the difference value of the added load WR+WL and the differential value of the added load WR+WL, the seat occupancy determination on the vehicle seat 1 may be executed on the basis of an integral value of the added load WR+WL. Further, the fourth threshold time frame $T_{th4}$ may be selectively set. For example, the fourth threshold time frame $T_{th4}$ may be set to be as close to zero as possible. In such a case, the mounting of the child seat 5 on the vehicle seat 1 may be determined on the basis of reaching of the added load WR+WL to the fourth threshold load $W_{th4}$ or smaller.

The apparatus and method for determining seat occupancy may be applied not only to the front passenger seat but also to middle seats and rear seats. Further, pressure sensors for detecting pressure, applied to the seat cushion 11 due to seat occupancy, may be used as the right and left seat occupancy sensors 2R and 2L, respectively. In such a case, the load, applied to the seat cushion 11, may be detected on the basis of the detected pressure. Alternatively, displacement sensors for detecting a displacement of the seat cushion 11 may be used as the right and left seat occupancy sensors 2R and 2L, respectively. In such a case, the load, applied to the seat cushion 11, may be detected on the basis of a displaced amount of the seat cushion 11 against a biasing force of seat springs.

At least one of the right and left seat occupancy sensors 2R and 2L may be provided to the seat cushion 11. Further, in a case where a plurality of seat occupancy sensors are provided to the seat cushion 11, one pair of right and left seat occupancy sensors 2R and 2L may be attached to the front portion of the seat cushion 11, or two pairs of right and left seat occupancy sensors 2R and 2L may be attached to the four corners of the seat cushion 11, respectively. Alternatively, the right and left seat occupancy sensors 2R and 2L may be attached to a front-right portion and a rear-left portion of the seat cushion 11, respectively. Further, alternatively, the right and left seat occupancy sensors 2R and 2L may be attached to a rear-right portion and a front-left portion of the seat cushion 11, respectively.

In a case where the ignition switch 8 is being ON when the buckle switch 65 is switched to ON, the seat occupancy determination may be executed only on the basis of the seat occupancy load peak determination. Alternatively, in a case where the ignition switch 8 is being ON when the buckle switch 65 is switched to ON, the seat occupancy determination may be executed so that the seat occupancy load peak determination and one of the seat occupancy load decreasing ratio determination and the seat occupancy load decreasing amount determination are executed simultaneously.

According to the embodiment, the mounting of the child seat 5 on the vehicle seat 1 may be executed only when both of the decreasing ratio condition and the left-right difference condition are established in Step 507 and Step 511 (see FIG. 5), respectively. Alternatively, the mounting of the child seat 5 on the vehicle seat 1 may be executed only when both of the decreasing ratio condition and the left-right difference condition are established in Step 507 and Step 511, respectively, within a predetermined time frame. In other words, the mounting of the child seat 5 on the vehicle seat 1 may not be determined when both of the decreasing ratio condition and the left-right difference condition are established so as to include a predetermined interval or more therebetween. In such a case, the determination may be executed so as to reflect more greatly the characteristic of the mounting of the child seat 5 on the vehicle seat 1. As a result, accuracy in determination may be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for determining a seat occupancy comprising:
 a load detecting portion attached to a seat portion of a vehicle seat to detect a seat occupancy load applied to the seat portion;
 a seatbelt buckling detecting portion detecting an engagement of a buckle of a seatbelt provided for the vehicle seat; and
 a seat occupancy determining portion determining the seat occupancy of the vehicle seat on the basis of detection signals from the seatbelt buckling detecting portion and the load detecting portion,
 the seat occupancy determining portion determining a mounted state of a child seat, in which the child seat is placed on the vehicle seat and is fixed to the vehicle seat by the seatbelt, when the seat occupancy load increases at a predetermined speed or faster in a predetermined continuous time period, which predetermined continuous time period includes a first constant time period set before the buckle is engaged and a second constant time period after the buckle is engaged, and decreases at a predetermined speed or faster in a constant time set after the seat occupancy load reaches a maximum load.

2. The apparatus for determining the seat occupancy according to claim 1, wherein the seat occupancy determining portion determines the mounted state of the child seat in a case where the seat occupancy load is increased to a predetermined value or larger and is decreased to a predetermined decreasing load or smaller and subsequently continues to be the decreasing load or smaller for a first predetermined time frame or longer within a second predetermined time frame after the seat occupancy load reaches a maximum load in a predetermined continuous time period set to include the time point when the buckle is engaged.

3. The apparatus for determining the seat occupancy according to claim 1, wherein the seat occupancy determining portion determines whether or not the child seat is in the mounted state only in a case where an ignition switch of the vehicle is being ON at the time point when the buckle is engaged.

4. The apparatus for determining the seat occupancy according to claim 2, wherein the seat occupancy determining portion determines whether or not the child seat is in the mounted state only in a case where an ignition switch of the vehicle is being ON at the time point when the buckle is engaged.

5. The apparatus for determining the seat occupancy according to claim 1, wherein the seat occupancy determining portion determines that the seat occupancy load is increased at the predetermined speed or faster in a case where the seat occupancy determining portion detects a predetermined differential value or larger within a time period proximate to the time point when the buckle is engaged.

6. The apparatus for determining the seat occupancy according to claim 3, wherein the seat occupancy determining portion determines that the seat occupancy load is increased at the predetermined speed or faster in a case where the seat occupancy determining portion detects a predetermined differential value or larger within a time period proximate to the time point when the buckle is engaged.

7. The apparatus for determining the seat occupancy according to claim 1, wherein the load detecting portion includes at least two load detecting portions, attached to left and right portions of the seat portion, respectively.

8. The apparatus for determining the seat occupancy according to claim 2, wherein the load detecting portion includes at least two load detecting portions, attached to left and right portions of the seat portion, respectively.

9. The apparatus for determining the seat occupancy according to claim 3, wherein the load detecting portion includes at least two load detecting portions, attached to left and right portions of the seat portion, respectively.

10. The apparatus for determining the seat occupancy according to claim 5, wherein the load detecting portion includes at least two load detecting portions, attached to left and right portions of the seat portion, respectively.

11. The apparatus for determining the seat occupancy according to claim 7, wherein the seat occupancy determining portion calculates an added load, in which loads, detected by the load detecting portions, are added and sets the added load to be the seat occupancy load.

12. The apparatus for determining the seat occupancy according to claim 8, wherein the seat occupancy determining portion calculates an added load, in which loads, detected by the load detecting portions, are added and sets the added load to be the seat occupancy load.

13. The apparatus for determining the seat occupancy according to claim 9, wherein the seat occupancy determining portion calculates an added load, in which loads, detected by the load detecting portions, are added and sets the added load to be the seat occupancy load.

14. The apparatus for determining the seat occupancy according to claim 10, wherein the seat occupancy determining portion calculates an added load, in which loads, detected by the load detecting portions, are added and sets the added load to be the seat occupancy load.

15. The apparatus for determining the seat occupancy according to claim 7, wherein the load detecting portions are attached to a rear portion of the seat portion.

16. The apparatus for determining the seat occupancy according to claim 8, wherein the load detecting portions are attached to a rear portion of the seat portion.

17. The apparatus for determining the seat occupancy according to claim 11, wherein the load detecting portions are attached to a rear portion of the seat portion.

18. The apparatus for determining the seat occupancy according to claim 12, wherein the load detecting portions are attached to a rear portion of the seat portion.

19. A method for determining a seat occupancy within a vehicle comprising:
 detecting a load applied to a seat portion of a vehicle seat;
 detecting, via a controller of the vehicle, an engagement state or a disengaged state of a buckle of a seatbelt of the vehicle seat; and
 determining a mounted state of a child seat, in which the child seat is placed on the vehicle seat and is fixed to the vehicle seat by the seatbelt, when the load increases at a predetermined speed or faster in a predetermined continuous time period, which predetermined continuous time period includes a first constant time period before the buckle is engaged and a second constant time period after the buckle is engaged, and
 decreases at a predetermined speed or faster in a constant time set after the seat occupancy load reaches a maximum load.

20. The apparatus for determining the seat according to claim 1, wherein the first constant time period is set to be the same as the second constant time period.

* * * * *